United States Patent Office 3,357,312
Patented Dec. 12, 1967

3,357,312
RADIAL-PISTON HYDRAULIC MOTOR
Anatoly Jakovlevich Rogov, Moscow Region, Ljubertsy, Jury Ivanovich Lovtsov, Moscow, and Vasily Kuzjmich Kuteinikov, Moscow Region, Ljubertsy, U.S.S.R., assignors to Institute Gornogo Dela imeni A.A. Skochinskogo
Filed Aug. 13, 1964, Ser. No. 389,401
5 Claims. (Cl. 91—176)

This invention relates to high-torque multiple-action radial-piston hydraulic motors used in displacement hydraulic transmissions, for instance in transport vehicle transmissions.

There are known multiple-action radial-piston hydraulic motors comprising a stator, a rotor accommodating radial pistons interacting with the shaped inside surface of the stator, and a coaxially mounted journal-type power fluid distributor fixed in relation to the stator in such a manner that each definite port opening corresponds to the certain piston position. In such hydraulic motors the pistons are rigid, non-deformable axially and the profile of the stator inside surface is shaped so that it does not provide for minimum piston speeds to be obtained on certain portions of travel.

A disadvantage of this design of hydraulic motors is that it does not allow variation of output torque and speed at constant power fluid delivery and pressure. When incorporated in the hydraulic transmissions of transport vehicles, for example, such hydraulic motors do not provide sufficient range of torque and speed variation adequate for the machines involved.

In a hydraulic transmission using such a motor, variation of torque and speed may be effected only by altering pump output and power fluid pressure. However, the range of torque and speed variation is narrow and inadequate for such a machine as, for example, a transport vehicle.

To obtain continuous variation of hydraulic motor output torque and speed, it is necessary to vary power fluid delivery per revolution. To this end, the journal-type power fluid distributor should be made rotatable in relation to the shaped inside surface of the stator.

In this case, however, the use of conventional, rigid pistons which are non-deformable axially may result in the piston support rollers being forced off the stator shaped surface at the end of the piston power travel as well as in power fluid being "squeezed" as the pistons are transferred from the return to the pressure line, which means that during variation of torque and speed the motor will produce knocks and noise, the efficiency of the motor being adversely affected.

In the event variation of hydraulic motor output torque and speed is effected by rotating a coaxial power fluid distributor the stator inside surface interacting with the pistons should be shaped so as to provide for minimum speed of piston travel during torque and speed variation, otherwise increase in hydraulic losses and impermissible non-uniformity (fluctuation) of output torque and speed will be caused.

The object of the invention is to provide a high-torque multiple-action radial-piston hydraulic motor with output torque and speed continuously variable even at constant power fluid pressure and pump output, the torque and speed variation involved being effected by varying power fluid delivery per revolution.

Another object of this invention is to provide a high-torque radial-piston hydraulic motor with continuously variable output torque and speed, the force required to effect said variation being so minimized as to permit and facilitate remote control of the hydraulic motor.

A third object of this invention is to provide a reversible high-torque radial-piston hydraulic motor with continuously variable output torque and speed and identical ranges of torque and speeed variation for normal and reverse rotation.

A fourth object of this invention is to provide a high-torque multiple-action radial-piston hydraulic motor with a wide range of continuous torque and speed variation and practically no decrease in efficiency, the construction of said motor being simple and dependable so as not to complicate the production thereof as compared with similar constant torque and speed hydraulic motors.

A fifth object of this invention is to provide a high-torque radial-piston hydraulic motor with variable torque and speed and having diametral overall dimensions less than those of the existing motors of this type, thereby facilitating application of said motor in such machines as, for example, transport vehicles, wherein the hydraulic motor is to be mounted in the vehicle wheel.

According to the present invention, a multiple-action radial-piston hydraulic motor comprises a rotor whose radial bores accommodate pistons; a stator with a shaped inside surface interacting with the pistons through crossheads; a ported power fluid distributor and a collector. To provide regulation of power fluid delivery per revolution, the distributor is made rotatable in relation to the stator. The pistons are axially deformable. The profile of the stator inside surface is formed by Archimedean spirals, arcs and polar parabolas of various orders so designed as to provide a maximum variation control angle, i.e., minimum piston speeds over variation portions of travel to suit the necessary range of motor displacement variation.

The pistons are each made of two barrels one of which fits into the other, a compensating spring being placed between the ends of said barrels. An alternative embodiment of the pistons is a slotted spring with closed end holes. The power fluid distributor has an auxiliary collector installed on the side opposite to the main collector.

The rotor of the hydraulic motor may have cylindrical projections coaxial with the radial bores for pistons. The crossheads may be sleeves with a cylindrical inside surface conjugated with the outside surface of the projections. An alternative embodiment is to have the conjugate surfaces of the rotor projections and the crossheads made as two parallel planes located parallel to the rotor axis, in which case there should be a perpendicular clearance space between the respective surfaces of the rotor projections and the crossheads, which clearance space will permit the crossheads to adjust themselves to the profile of the stator inside surface.

An embodiment of the present invention is described by way of example with reference to the accompanying drawings, wherein.

Figure 3:
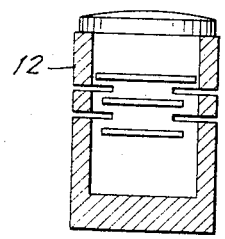
FIG. 3 shows an embodiment of a hydraulic motor piston.

The stator is built up of parts 1, 2 and 3 (FIG. 1) and accommodates rotor 4 which is mounted in ball bearings and rigidly connected with output shaft 5. Rotor 4 has an axial through hole which accommodates rotatably mounted ported power fluid distributor 6 and auxiliary collector 7. Rotor 4 has radial bores 8 accommodating pistons. In one embodiment, the piston is comprised of two parts 9 and 10 fitting into each other, spring 11 being installed between the ends thereof to compensate for impact loading during torque and speed variation. Another embodiment of the piston is shown at 12 in FIGURE 3 where the piston is a slotted spring with closed ends. Crosshead 13 is in the form of a sleeve with a cylindrical inside surface, which crosshead is placed on projections 14 fixed to the rotor and transmits force from the piston through the stator to the rotor with the aid of rollers 15 mounted on the crosshead arms.

Figure 6:
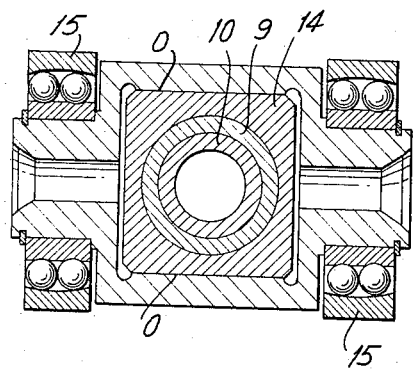
FIG. 6 shows another embodiment of a crosshead.

The conjugate surfaces of the crosshead and the rotor projections may be made as two parallel planes O (FIG. 6) located parallel to the rotor axis, in which case a perpendicular clearance space is provided between the outside surface of the rotor projections and the inside surface of the crossheads, which clearance space allows the crossheads to adjust themselves to the profile of the stator inside surface.

Figure 2:
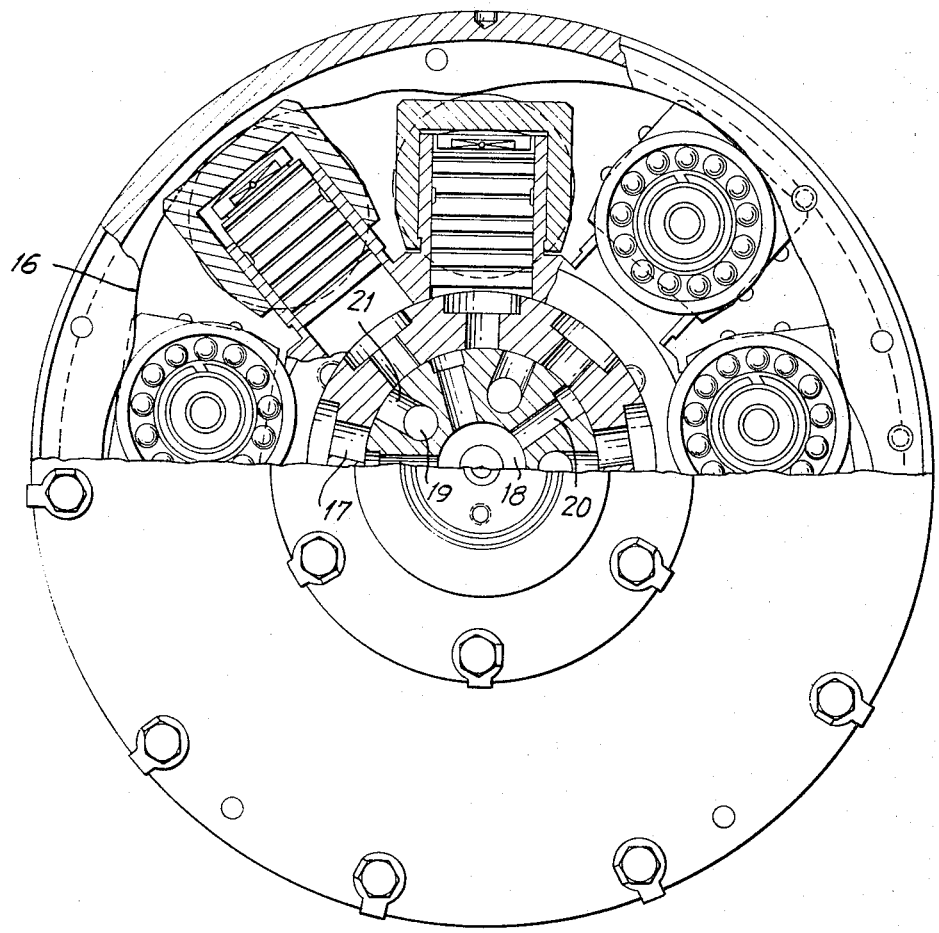
FIG. 2 is a partial section on the line AA of FIGURE 1.

Inside surface 16 (FIG. 2) of the stator has the same number of projections and depressions corresponding to the number of motor strokes, the profile of said projections and depressions providing from minimum speed of piston travel during variation of output torque and speed.

To ensure dependable and economic operation of a hydraulic motor, the profile of the stator inside surface should be so shaped as to allow for a maximum variation angle, i.e. for minimum speed of piston travel during regulation of output torque and speed. Such a profile will minimize non-uniformity of power fluid delivery and hydraulic losses during torque and speed variation.

For a further understanding of the abovesaid an example of designing the profile of the stator inside surface will be given.

*Example of designing profile of high-torque multiple-action hydraulic motor*

Initial data:

$d = 40$ mm. (piston diameter)
$h = 21$ mm. (piston stroke)
$x = 5$ (number of power strokes per revolution)
$\rho_0 = 108$ mm. (initial radius vector of profile equidistant curve)
$R_r = 36$ mm. (roller radius)
$L = 15$ mm. (width of stator track)
$G_t = 2.5$ kg. (weight of piston group)
$n = 150$ r.p.m. (speed)
$P_{del} = 105$ kg./sq. cm. (delivery line pressure)
$P_{ret} = 5$ kg./sq. cm. (return line pressure)
$D = 2.5$ (range of torque and speed variation)
$\omega =$ (angular velocity of output shaft).

(1) Define limitations.
(a) With reference to permissible contact loads define the radius of the profile curvature at the bottom dead centre.

Let the radius of the profile equidistant curve $R_{eq} = 50$ mm., then the radius of the profile curvature at this point $$R\rho = R_{eq} - R_r = 50 - 36 = 14 \text{ mm.}$$

By Hertz's formula $$\sigma = 0.5\pi \sqrt{\frac{EP}{2L} \frac{R\rho + R_r}{R\rho \times R_r}}$$

where $$P = \frac{\pi d^2}{8} P_{del} = 650 \text{ kg.}$$

force imposed per roller $$\sigma = 0.591 \sqrt{\frac{2.1 \times 10^6 \times 650/1.4 + 3.6}{2 \times 1.5 \times 1.4 \times 3.6}} = 12000 \text{ kg./sq. cm.}$$

$\sigma$ permissible $= 12000 - 14000$ kg./sq. cm. for materials commonly used in manufacture of the stator, required heat treatment being provided.

(b) With reference to continuous travel of the rollers over the profile of the stator shaped surface under pressure $P = P_{ret}$ define the value of inertia force permissible for maximum speed and, consequently, the value $$\left|\frac{d^2\rho}{d\alpha^2}\right|^*_{max}$$

for the portions where $$\frac{d^2\rho}{d\alpha} < 0; \quad \frac{\pi d^2}{4} P_{ret} + \frac{G}{g}\omega^2\rho_0 \geq K\frac{G}{g}\omega^2 \left|\frac{d^2\rho}{d\alpha^2}\right|^*_{max}$$

Here, to simplify the calculation, assume that the centre of gravity of the piston group coincides with the centre of the rollers; $K = 1.35$ (safety factor).
Wherefrom $$\left|\frac{d^2\rho}{d\alpha^2}\right|^*_{max} = \frac{63 + 6.75}{1.35 \times 0.632} = 83 \frac{\text{cm.}}{\text{rad.}^2}$$

or $$\left|\frac{d^2\rho}{d\alpha^2}\right|^*_{max} = 0.0253 \frac{\text{cm.}}{\text{deg.}^2}$$

(c) As has been found by experience, inertia force on the portions where $$\frac{d^2\rho}{d\alpha^2} > 0$$

must not exceed 10 percent of the forces determined by the delivery pressure of the power fluid.
Define $$\left|\frac{d^2\rho}{d\alpha^2}\right|^{**}_{max}$$

for these portions $$\frac{\pi d^2}{4} P_{del} \frac{95\%}{100\%} = \frac{G}{g}\omega^2 \left|\frac{d^2\rho}{d\alpha^2}\right|^{**}_{max}$$

wherefrom $$\left|\frac{d^2\rho}{d\alpha^2}\right|^{**}_{max} = 194 \frac{\text{cm.}}{\text{rad.}^2}$$

or $$\left|\frac{d^2\rho}{d\alpha^2}\right|^{**}_{max} = 0.06323 \frac{\text{cm.}}{\text{deg.}^2}$$

(d) Let maximum permissible pressure angle $\gamma = 43°$, and define $$\left|\frac{d\rho}{d\alpha}\right|_{max}$$

assuming that $\gamma_{max}$ is in the midstroke $$tg\gamma = \left(\frac{d\rho}{d\alpha} \times \frac{\pi}{180}\right) \div \left(\rho_0 + \frac{h}{2}\right)$$

wherefrom $$\left|\frac{d\rho}{d\alpha}\right|_{max} = \frac{0.935 \times 11.7\pi}{180} = 0.1897 \text{ cm./deg.}$$

(2) Define the angle of rotation through which the piston makes one double stroke $$\alpha_x = \frac{360}{x} = \frac{360}{5} = 72°$$

Let $\alpha_H = 36°$; $\alpha_c \pm 36°$; $\alpha_H + \alpha_c = 72°$.

where $\alpha_H =$ angle of rotation through which the piston makes one power stroke,
$\alpha_c =$ angle of rotation through which the piston makes one idle stroke.

(3) Calculation of the delivery portion of the profile.
I. The first portion is found from the equation (arc):

$$\rho = (\rho_0 + R_{eq}) \cos\alpha - \sqrt{R_{eq} - (\rho_0 + R_{eq})^2 \sin\alpha^2}$$

Find $$\frac{d\rho}{d\alpha}$$

and $$\frac{d^2\rho}{d\alpha^2}$$

Write (a)
$$\frac{d\rho}{d\alpha} = \left|\frac{d\rho}{d\alpha}\right|_{max} > 0$$

and (b)
$$\frac{d^2\rho}{d\alpha^2} = \left|\frac{d^2\rho}{d\alpha^2}\right|^*_{max} > 0$$

In this example, at lesser angle $\alpha_I = 11.5°$ the equation (b) is correct.

Consequently, the equation for the first portion is true within $0 \leq \alpha_I \leq 11.5°$.

Substituting $\alpha_I = 11.5°$ in the equation of the equidistant curve, define the travel over the first portion:

$h_1 = (10.8+5) \cos 11.5° -$
$\sqrt{25-15.8^2 \sin^2 10.5°} - 10.8 = 0.817$ cm.

and $$\frac{d\rho}{d\alpha_I} = 0.1644 \text{ cm./deg.}$$

This portion may be also delivered from a third-order curve.

II. Find the angle at which the profile is defined by the equation (polar parabola):

$$\rho = \rho_0 + h_1 + \frac{d\rho}{d\alpha_I}(\alpha-\alpha_I) + \left|\frac{d^2\rho}{d\alpha^2}\right|^*_{max}\left(\frac{\alpha-\alpha_I}{2}\right)^2$$

$$\frac{d\rho}{d\alpha_I} + \left|\frac{d^2\rho}{d\alpha^2}\right|^*_{max}(\alpha-\alpha_I) = \left|\frac{d\rho}{d\alpha}\right|_{max}$$

wherefrom, at $\alpha = 12.5°$, $\alpha_{II} = 12.5°$ $$\rho = \rho_0 + h_1 + h_2$$

where $h_2 = 0.1821$ cm.

III. The next portion is found from the equation (Archimedean spiral):

$$\rho = \rho_0 + h_1 + h_2 + \left(\frac{d\rho}{d\alpha}\right)_{max}(\alpha-\alpha_{II})$$

I.e. the length of the portion = 1°, to be checked by further calculation.

Let $\alpha_{III} = 13.5°$.

$$\rho = \rho_0 + h_1 + h_2 + h_3$$

where $h_3 = 0.1897$ cm.

IV. The next portion is found from the equation (polar parabola):

$$\rho = \rho_0 + h_1 + h_2 + h_3 + \left|\frac{d\rho}{d\alpha}\right|_{max}(\alpha-\alpha_3) - \left|\frac{d^2\rho}{d\alpha^2}\right|^{**}_{max}\frac{(\alpha-\alpha_3)^2}{2}$$

wherefrom $\alpha_4 = 16.5°$; at $\alpha = \alpha_4$ $\rho = \rho_0 + h_1 + h_2 + h_3 + h_4$ where $h_4 = 0.2845$ cm.

V. The curve of the fifth portion of the profile is an Archimedean spiral.

The curve of the sixth portion of the profile is a polar parabola.

To find the equations of the fifth and sixth portions, find the remaining stroke $h^* = h - h_1 - h_2 - h_3 - h_4 = 0.627$ cm. and the remaining angle $\alpha_H - \alpha_4 = 19.5°$.

$$\frac{d\rho}{d\alpha_{(5)}} = \frac{h - h_1 - h_2 - h_3 - h_4}{\alpha_H - \alpha_4} = 0.03215 \text{ cm./deg.}$$

Find the point of intersection of the curves of portions IV and V and the curves of portions V and VI; let $$\frac{d^2\rho}{d\alpha^2} = 0.06323 \text{ cm./deg.}$$

Thus we get the equations of the curves for the delivery portion of the profile.

Find the obtained range of torque and speed variation.

$$D = \frac{h}{h-2h^*}; \quad D = \frac{2.1}{2.1-2 \times 0.9627} = 2.5$$

If the range of torque and speed variation is less than the given value, decrease the length of portion III and find the new value of $h^*$ and $$\frac{d\rho}{d\alpha_{(5)}}$$

If at length of portion III = 0 the range of torque and speed variation is less than the given value, decrease the length of portion II.

If the obtained range of torque and speed variation exceeds the given value, increase the length of portion III (in this example the length of portion III is equal to 1°).

4. Find the variation control angle (the angle of rotation of the power fluid distributor).

$$\varphi = \alpha_H - \alpha_4 + \frac{\frac{d\rho}{d\alpha_{(5)}}}{\left|\frac{d^2\rho}{d\alpha^2}\right|^{**}_{max}} = 20.008°$$

5. Calculation of the return portion of the profile.
I. The first portion is found from the equation:

$$\rho = (\rho_0 + R_{eq}) \cos\alpha - \sqrt{R_{eq} - (\rho_0+R_{eq})^2 \sin^2\alpha}$$

Find the value of the angle $\alpha$ at which $$\frac{d\rho}{d\alpha} = \frac{d\rho}{d\alpha_{(5)}} = 0.03215 \frac{\text{cm.}}{\text{deg.}} \quad \alpha_I = 3.178°$$

Find the stroke corresponding to this angle $h_1 = 0.0412$ cm.

This portion may be also derived from a cubic polar parabola.

II. Find the length of the second portion.

$\varphi - \alpha_I = 20.008° - 3.178° = 16.83°$

Find the stroke on the second portion.

$$\frac{d\rho}{d\alpha_{(5)}} = 0.03215 \times 16.83 = 0.5419 \text{ cm.}$$

Find the remaining stroke $h^* = h - h_1 - h_{II} = 2.1 - 0.0412 - 0.5419 = 1.5269$ cm.

Find the remaining angle $\alpha_{III,IV} - \alpha_c - \varphi = 15.992°$

The third and fourth portions of the profile are formed by polar parabolas or may be formed by other curves of a higher order.

Co-ordinates of the points for the third and fourth portions are found from the equation $$\left|\frac{d^2\rho}{d\alpha^2}\right|^{}_{max}\frac{x^2}{2} + \left[\left|\frac{d^2\rho}{d\alpha^2}\right|^{}_{max} x + \frac{d\varphi}{d\alpha_{(5)}}\right]\frac{(\alpha_{III,IV} - X)}{2} = h^*$$

i.e. $0.06323\frac{x^2}{2} + (0.06323X + 0.03215) - \frac{15.992-X}{2} = 1.5269$ wherefrom $x = 2.594°$ $\left|\frac{d^2\rho}{d\alpha^2}\right|^{**}_{max} x = 0.16393$ cm./deg.

Thus all the points have their co-ordinates and the profile may be plotted.

Since the curve $dh/d\alpha = f(\alpha)$ is given, $h = f(\alpha)$ is found by integration.

Tabulate $\rho = \rho_0 + h$ at 0.5° or 1° intervals and plot the equidistant curve of the profile.

The profile is found as a curve following circles of radius $R_\rho$ the centres of which are on the equidistant curve of the profile.

To illustrate the above calculation, FIG. 7 shows a graph representing the $d\rho/d\alpha$ as a function of the $\alpha$.

The equations given herein are not the only possible ones. However, the main condition, namely, maximum possible increase in the variation control angle and, consequently, reduction of piston speeds on variation portions of the profile, remains invariable.

Rotor 4 (FIG. 1) has radial passages 17 which are coaxial with holes 8 and connect these holes with the axial hole centrally located in the rotor. Ported power fluid distributor 6 has a centrally located axial channel 18 closed at either end and off-centre closed passages 19 the number of which is equal to that of the projections on the stator inside surface.

Powel fluid distributor 6 has radial passages 20 connecting the central axial channel with rotor passages 17, with the rotor in a certain angular position, passages 17 permit the power fluid to flow to or from the pistons, depending on the direction of rotation. Power fluid distributor 6 also has radial passages 21 which return the power fluid from the pistons according to the angular position of the rotor.

Pin 22 provided on power fluid distributor 6 enables the distributor to be rotated around its axis and set in an adjusted position with respect to shaped inside surface 16 of the stators so as to vary power fluid delivery per revolution and thus obtain continuous variation of output torque and speed.

The angular position of the power fluid distributor may be controlled manually or remotely. Little effort is required to rotate the distributor, which facilitates the use of remote control of the hydraulic motor.

For the power fluid to flow to and from the axial passages in the distributor, radial passages 23 and 24 are provided therein, which passages bring axial passages 18 and 19 in communication with the high and low pressure power fluid lines in collector 25.

Attached to part 2 of the casing is cover 26 which has connections 27 for the power fluid to pass to and from collector 25 as the power fluid is supplied from a hydraulic pump or some other source of fluid pressure.

Figure 1:
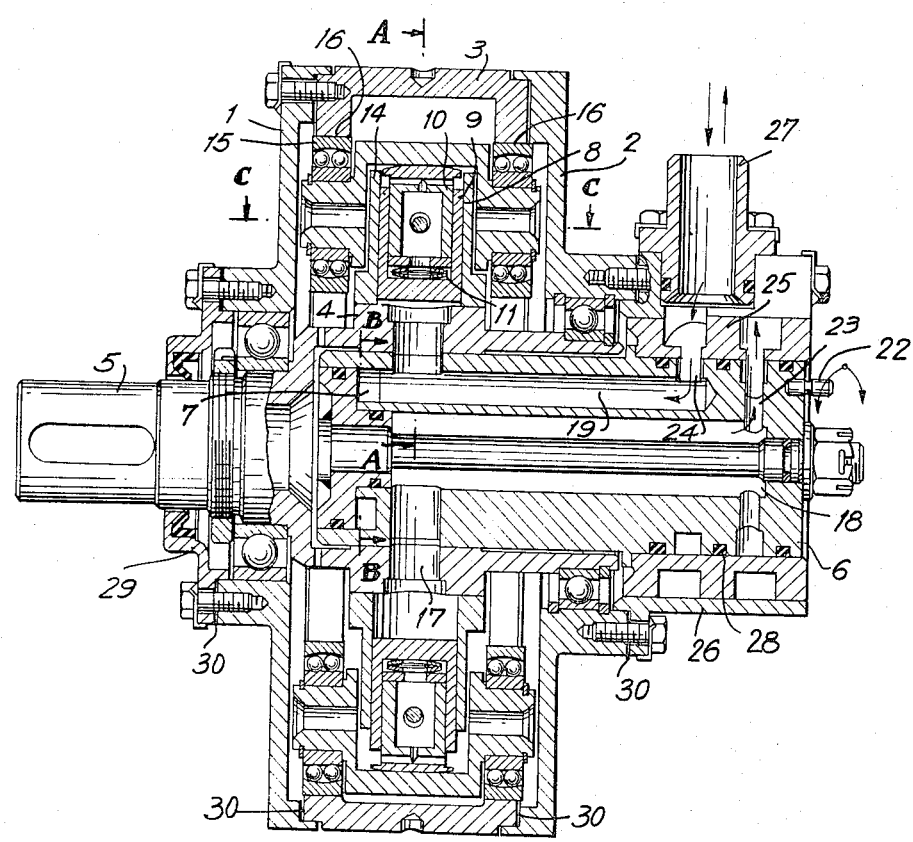
FIG. 1 is a longitudinal section through a multiple-action radial-piston hydraulic motor taken on the rotor axis.
Figure 4:
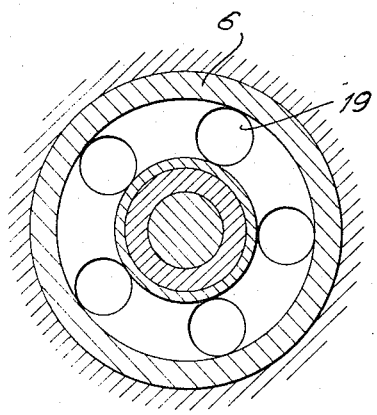
FIG. 4 is a section on the line BB of FIGURE 1 showing the disposition of the passages in the auxiliary collector.
Figure 5:
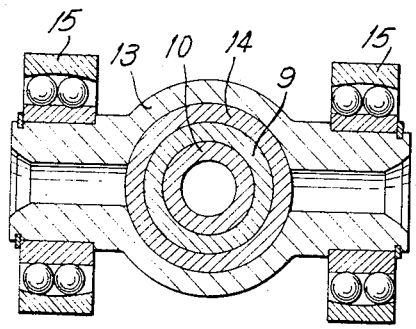
FIG. 5 is a section on the line CC of FIGURE 1 showing the construction of the crossheads for transmitting force from the pistons and for relieving the pistons of the side thrust.

Mounted inside distributor 6 at output shaft 5 is auxiliary collector 7 which provides communication between passages 19 as shown in FIGS. 1 and 4 and serves to reduce hydraulic losses during torque and speed variation.

Collector 25, power fluid distributor 6, connections 27 and output shaft 5 are sealed by means of elastic rings 28. The joints between parts 1, 2 and 3 of the casing as well as the joints of covers 26 and 29 are sealed by gaskets 30.

The hydraulic motor operates as follows:

Power fluid supplied by hydraulic pump or some other source of hydraulic pressure is forced through collector 25 and the appropriate axial and radial passages of power fluid distributor 6 and passes underneath piston part 9 where the fluid pressure is transmitted through spring 11 and piston part 10 to crosshead 13 and rollers 15 mounted on the crosshead arms. Interaction of the rollers and shaped surface 16 of stator part 3 gives rise to torque, whereby rotor 4 and output shaft 5 rigidly connected thereto are rotated with respect to the stator. With designs where the rotor is a stationary part the stator and the output shaft connected thereto are rotated. Radial passages 20 and 21 in power fluid distributor 6 are so disposed in relation to the shaped surface of the stator that the admission spaces under the pistons are in communication with the pressure line as roller 15 rides on the working portion of the profile, said admissison spaces being in communication with the return line as the roller is transferred to the profile idle portion.

Variation of output torque and speed is effected by rotating power fluid distributor 6 by means of pin 22 through an angle equal to or less than the variation control angle (see the example of profile calculation). With the power fluid distributor rotated, the position of radial passages 20 and 21 is altered relative to the stator enabling continuous variation of power fluid delivery per revolution and, consequently, in variation of output, torque and speed.

What is claimed is:

1. A high-torque multiple-action radial-piston hydraulic motor comprising: a rotor having radial bores and a centrally located axial through hole; radial passages being provided in said rotor which are coaxial with said bores and connect said bores with the centrally located axial hole in the rotor; an output shaft rigidly connected to said rotor; a stator including a front end part provided with a hole to accommodate said output shaft and a rear end part provided with a hole coaxial with said hole in the front end part of the stator and accommodating said rotor, and a center part having an inside surface with identical projections and identical depressions the number of which corresponds to that of the hydraulic motor strokes; said inside surface of the stator so shaped as to provide a maximum variation control angle and a minimum velocity of the power fluid in the rotor passages during torque and speed variation; pistons adapted for axial deformation to compensate for impact loading during torque and speed variation and accommodated in said radial bores in the rotor so that they can move axially inside the bores; means for transmitting force from said pistons to the stator; a ported power fluid distributor rotatably mounted in said centrally located rotor hole and having radial and axial passages for power fluid to pass to and from said radial passages in the rotor different angular positions of the rotor; means for rotating said power fluid distributor around its axis in order to vary power fluid delivery per revolution; a main collector provided in order to allow power fluid to pass to and from said power fluid distributor; an auxiliary collector located in said distributor opposite said main collector and providing communication between the axial passages of the distributor; and means for delivering power fluid to said main collector and returning it therefrom.

2. A high-torque multiple-action radial-piston hydraulic motor comprising: a rotor having radial bores and a centrally located axial through hole; radial passages in being provided in said rotor which are coaxial with said bores and connect said bores with the centrally located axial hole in the rotor; an output shaft rigidly connected to said rotor; a stator including a front end part provided with a hole to accommodate said output shaft, a rear end part provided with a hole coaxial with said hole in the front end part of the stator and accommodating said rotor, and a center part having an inside surface with identical projections and identical depressions the number of which corresponds to that of the hydraulic motor strokes; said inside surface of the stator being so shaped as to provide a maximum variation control angle and minimum velocity of the power fluid in the rotor passages during torque and speed variation; pistons each of which includes two barrels fitting into each other and a spring between the ends of the barrels to compensate for impact loading during torque and speed variation, said pistons being accommodated in said rotor radial bores so that they can move axially inside said bores, means for transmitting force from said pistons to said stator and to relieve the pistons of side thrust; a ported power fluid distributor rotatably mounted in said centrally located rotor hole and having radial and axial passages for power fluid to pass to and from said radial passages in the rotor at appropriate angular positions of the rotor; means for rotating said power fluid distributor around its axis in order to vary power fluid delivery per revolution; a collector allowing power fluid to pass to and from said power fluid distributor; an auxiliary collector providing communication between the axial passages of the distributor for reducing hydraulic losses during torque and speed variation, said auxiliary collector being located in said power fluid distributor on the side opposite to said main collector, and means for delivering power fluid to said main collector and returning it therefrom.

3. A high-torque multiple-action radial-piston hydraulic motor comprising: a rotor having radial bores and a centrally located axial through hole; radial passages being provided in said rotor which are coaxial with said radial bores, an output shaft rigidly connected to said rotor, a stator including a front end part provided with a hole to accommodate said output shaft, a rear end part provided with a hole coaxial with said hole in the front end part of the stator and accommodating said rotor, and a center part having an inside surface with identical projections and identical depressions the number of which corresponds to that of the hydraulic motor strokes; said inside surface of the stator being so shaped as to provide a maximum variation control angle and provide minimum velocity of the power fluid in the rotor passages during torque and speed variation; pistons including slotted springs provided with closed end holes and accommodated in said rotor bores so that they can move axially inside said bores; means for transmitting force from the pistons to the stator and relieving the pistons of side thrust; a ported power fluid distributor rotatably mounted in said cenrally located rotor hole and having radial and axial passages for power fluid to pass to and from said radial passages in the rotor at different angular positions of the rotor; means for rotating said power fluid distributor around its axis in order to vary power fluid delivery per revolution; a collector to allow power fluid to pass to and from said power fluid distributor; means for delivering power fluid to said collector and returning it therefrom; and an auxiliary collector providing communication between the axial passages of the distributor for reducing hydraulic losses during torque and speed variation and located in said power fluid distributor on the side opposite to said main collector.

4. A high-torque multiple-action radial-piston hydraulic motor comprising: a rotor having radial bores and a centrally located axial through hole; radial passages provided in said rotor which are coaxial with said bores and connect said bores with the centrally located axial hole in the rotor; an output shaft rigidly connected to said rotor; a stator including a front end part provided with a hole to accommodate said output shaft, a rear end part provided with a hole coaxial with said hole in the front end part of the stator and accommodating said rotor, and a center part having an inside surface with identical projections and identical depressions the number of which corresponds to that of the hydraulic motor strokes; said inside surface on the stator being so shaped as to provide a maximum variation control angle and minimum velocity of the power fluid in the rotor passages during torque and speed variation, pistons adapted for axial deformation to compensate for impact loading during torque and speed variation and accommodated in said radial bores in the rotor so that they can move axially inside said bores; cylindrical projections disposed on said rotor coaxially with said radial bores; means for transmitting force from the pistons to the stator and relieving the pistons of side thrust incorporating a crosshead, which crosshead is a sleeve whose inside cylindrical surface conjugates with the outside surface of said cylindrical projections; two coaxial arms on each of said crossheads, which arms are perpendicular to the axis of said inside surface of the sleeve; rollers mounted on said crosshead arms and riding on the shaped inside surface of the stator during operation of the hydraulic motor; a ported power fluid distributor rotatably mounted in said centrally located rotor hole and having radial and axial passages for power fluid to pass to and from said radial passages in the rotor at appropriate angular positions of the rotor; means for rotating said power fluid distributor around its axis in order to vary power fluid delivery per revolution; a collector to allow power fluid to pass to and from said power fluid distributor, means for delivering power fluid to said collector and returning it therefrom; and an auxiliary collector located in said distributor opposite said main collector and providing communication between the axial passages of the distributor for reducing hydraulic losses during torque and speed variation.

5. A high-torque multiple-action radial-piston hydraulic motor comprising; a rotor having radial bores and a centrally located axial through hole; radial passages provided in said rotor which are coaxial with said bores and connect said bores with the centrally located axial hole in the rotor; an output shaft rigidly connected to said rotor; a stator including a front end part provided with a hole to accommodate said output shaft, a rear end part provided with a hole coaxial with said hole in the front end part of the stator and accommodating said rotor, and a center part having an inside surface with identical projections and identical depressions the number of which corresponds to that of the hydraulic motor strokes; said inside surface of the stator being so shaped as to provide a maximum variation control angle and minimum velocity of the power fluid in the rotor passages during torque and speed variation; pistons capable of axial deformation to compensate for impact loading during torque and speed variation and accommodated in said radial bores in the rotor so that they can move axially inside said bores; projections on said rotor and having side surfaces with at least two parallel planes coaxial with said radial bores and parallel to rotor axis, means for transmitting force from the pistons to the stator and relieving the pistons of side thrust incorporating crosshead with an inside surface having two parallel planes through which said crossheads conjugate with said side surface of the rotor projections, the rest of the inside surface of said crossheads clearing the side surface of said rotor projections so that the crossheads can adjust themselves to the profile of the shaped inside surface of the stator; two coaxial arms on each of said crossheads, which arms are perpendicular to the crosshead axis and parallel to the planes in which the crossheads conjugate with the projections; rollers mounted on said crosshead arms and riding on the shaped inside surface of the stator during operation of the hydraulic motor; a ported power fluid distributor rotatably mounted in said centrally located hole in the rotor and having radial and axial passages for power fluid to pass to and from said radial passges in the rotor at the appropriate angular positions of the rotor; means for rotating said power fluid distributor around its axis in order to vary power fluid delivery per revolution; and a collector to allow power fluid to pass to and from said power fluid distributor; means for delivering power fluid to said collector and returning it therefrom; and an auxiliary collector located in said distributor opposite said main collector and providing communication between the axial passages of the distributor for reducing hydraulic losses during torque and speed variation.

References Cited

UNITED STATES PATENTS

| 755,161 | 3/1904 | Nielsen | 91—205 |
| 1,888,860 | 11/1932 | Kercher | 230—177 |
| 2,111,659 | 3/1938 | Benedek | 91—205 |
| 2,382,389 | 8/1945 | Benedek | 91—205 |

FOREIGN PATENTS

| 441,760 | 1/1936 | Great Britain. |
| 633,773 | 12/1949 | Great Britain. |

MARTIN P. SCHWADRON, *Primary Examiner.*

PAUL E. MASLOUSKY, EDGAR W. GEOGHEGAN,
*Examiners.*